United States Patent [19]
Kane et al.

[11] Patent Number: 4,611,208
[45] Date of Patent: Sep. 9, 1986

[54] MEANS FOR ALIGNING ELEVATION BEAM PATTERN ALONG AN ISODOP IN SYNTHETIC APERTURE MAPPING RADAR

[75] Inventors: Jerry A. Kane, Crofton, Md.; Winthrop W. Smith, Jr., Maitland, Fla.

[73] Assignee: The United States of America as represented by the Secretary of the Air Force, Washington, D.C.

[21] Appl. No.: 538,872

[22] Filed: Oct. 4, 1983

[51] Int. Cl.$^4$ ............................................. G01S 13/90
[52] U.S. Cl. ................................................. 343/5 CM
[58] Field of Search .................. 343/5 CM, 354, 824, 343/5 NQ, 5 DP, 5 MM, 368, 371, 17.1 PF, 5 ST, 372, 377

[56] References Cited
U.S. PATENT DOCUMENTS

| | | | |
|---|---|---|---|
| 2,911,644 | 11/1959 | Stavis | 343/758 |
| 3,235,865 | 2/1966 | Flower et al. | 343/8 |
| 3,423,752 | 1/1969 | Schwartz | 343/8 |
| 3,430,236 | 2/1969 | Gamertsfelder | 343/7 |
| 3,480,958 | 11/1969 | Tcheditch | 343/371 |
| 4,084,158 | 4/1978 | Slawsby | 343/17.1 PF |
| 4,280,127 | 7/1981 | Lee et al. | 343/5 CM |

OTHER PUBLICATIONS

J. Kirk; "Motion Compensation for Synthetic Aperture Radar"; IEEE Trans. on Aerospace and Electronic Systems, vol. AES-11, 5/75, pp. 338-348.

Primary Examiner—Thomas H. Tarcza
Assistant Examiner—Bernarr Gregory
Attorney, Agent, or Firm—Donald J. Singer; Willard R. Matthews

[57] ABSTRACT

Using an electronically scanned phased array antenna, a technique is developed for aligning a broad elevation beam along an isodop for use in synthetic aperture mapping. A beam steering controller algorithm for practical implementation of the technique is described. Implementation is realized by means of a beam steering controller and the radar computer. The controller first finds the space stabilized row and column for a given phase shifter. A look-up table furnished by the radar controller provides a slope correction as a function of row. The slope is multiplied by the element column to give the correct linear phase function. This term is then subtracted from the term used to point the beam peak.

5 Claims, 13 Drawing Figures

MEANS FOR ALIGNING ELEVATION BEAM PATTERN ALONG AN ISODOP IN SYNTHETIC APERTURE MAPPING RADAR

BACKGROUND OF THE INVENTION

This invention relates to synthetic aperture mapping radars and in particular to a beam steering controller algorithm and implementation means for aligning the elevation beam pattern with an isodop.

Modern airborne multimode radars use electronically scanned phased array antennas whose broadside is coincident with the aircraft velocity vector. With such an antenna, the antenna elevation beam axis, the line about which the elevation pattern lies, is a hyperbola on the ground about the cross track vector.

The synthetic aperture modes of these radars are being required to map large swath widths where depression angle coverage is large (40°–45°) and at pointing angles near the aircraft velocity vector. The design of the digital signal processor for these modes is considerably simplified if it can be tuned to a single isodop at a given scan angle. The processor would then "track" an isodop. An isodop, however, is a hyperbola on the ground about the aircraft velocity vector; it is thus naturally misaligned with the antenna elevation beam axis.

A problem that seriously degrades coverage in the wide scan mode pertains to this misalignment between isodops and the area illuminated by the antenna elevation pattern. This has come to be known as the isodop-isogain misalignment problem. Isodops are, of course, lines of constant doppler frequency on the ground; they are hyperbolas about the aircraft velocity vector as shown in FIG. 1. For a phased array radar whose broadside is coincident with the aircraft velocity vector, the antenna elevation pattern also lies along a hyperbola but this hyperbola lies about the crosstrack axis as in FIG. 1. If the array were a single row of elements, then a cone whose axis was the line array and the apex half-angle was the complement of the scan angle, it would define a surface of constant gain. The intersection of this cone with the earth is a hyperbola about the crosstrack. This hyperbola is then a true isogain since the gain along it is constant. As more rows are added and the array acquires a finite elevation aperture, the elevation pattern no longer covers the entire hyperbola, but it still lies along part of this hyperbola in one quadrant. This is a basic property of any phased array antenna. This hyperbola is still considered an isogain although it is no longer a true isogain. One property of the mainbeam being confined to lie along this hyperbola is as follows: if an azimuth beam is defined as being normal to the elevation beam axis at any point in the mainbeam, then the differential gain between any two hyperbolas in the mainbeam, measured along an azimuth beam axis, is constant.

As is shown in FIG. 1, if the antenna scan angle is chosen so that isogain (elevation beam axis) and isodop are aligned at far range, then they diverge or become misaligned at near ranges. This misalignment is particularly acute at small (<30 degrees) scan angles and steep (>20 degrees) depression angles. This partly explains why the misalignment problem does not occur in previous mapping radars; they operated at wide scan angles and shallow depression angles. This misalignment is a problem since the simplest signal processor one can build is tuned to a single isodop for a given scan angle. That is, all range gates are tuned to a single isodop frequency. The processed resolution cells then lie along the isodop. When the isodop and isogain are misaligned, however, the antenna mainlobe will never illuminate the isodop, implying no map can be made then. By the criterion of adequate map S/N, the isodop and isogain must be aligned within plus or minus half an azimuth beamwidth. Azimuth ambiguity depression requirements, however, dictate a slightly more stringent alignment of plus or minus a quarter of an azimuth beamwidth.

One possible solution to the problem is to do nothing, that is, tune the processor to a single frequency without modifying the beam in any manner. The performance of radars operating in accordance with this approach has been clearly unacceptable since a desirable map cannot be made at far aircraft altitudes above 25,000 feet. Increasing the alignment criterion of the S/N ratio to that of half a beamwidth has not been found to increase coverage substantially. The "do nothing" approach therefore is unacceptable from a performance viewpoint indicating that the processor tuning of the antenna pattern must be modified.

Electronically rolling the antenna aperture has also been proposed as a method of aligning the elevation beam along an isodop. Electronic rolling does not reshape the beam at all; it simply reorients the beam to provide a better beam/isodop alignment than was available without electronic roll. A typical criterion for selecting the optimum electronic roll angle is to make the beam a tangent to the isodop at some point (usually the center) in the desired mapping range. The beam is then perfectly aligned with the isodop at map center, but it deviates from it at any other point. Electronic rolling is easily mechanized in the beam controller by simply scaling the direction cosines by the sin/cos of the roll angle. This function is performed in software in the radar computer. Electronic rolling is an adequate solution to the beam/isodop alignment problem when the mapped range swath is a small fraction (10–20%) of the mapping range and mapping depression angles are small (less than 25°). It is not effective however when mapped range swaths are large compared to the mapping range (50% or greater), and mapping depression angles approach 45°. Furthermore detailed examination of the beam pointing command software, however, revealed that inducing a "false" roll to the elevation pattern requires major revision of the existing software, with the result being somewhat clumsy and not efficient. Further, the STC functions required to smooth the return signal level over the swath are very complicated with much ripple. Thus, this solution results in marginal performance and contains mechanization difficulties that render it unattractive.

Another proposed solution to the problem comprehends retuning the doppler frequency of the radar processor from range gate to range gate. Here no reshaping or reorienting of the beam is performed; instead the processor is tuned to map the isodops illuminated by the elevation beam. To implement this, the processor map reference generator (MRG) must calculate the isodop frequency of each range gate on the isogain. The impact of this on the MRG has been found to be substantial; an increase of approximately 500 chips of mainly very high speed hardware is required. The calculations are made particularly cumbersome by the fact that aircraft motion compensation must be included. The basic concept of calculating the individual doppler frequencies has, however, a basic flaw in that the MRG must know the aircraft altitude above each range gate to properly calculate the frequency. In fact, it only knows the altitude directly below the aircraft. Nonflat terrain can then result in incorrect isodop frequencies calculated for various segments of terrain. Terrain variations of only a few hundred inches could cause significant isodop errors with resultant S/N loss. The digital hardware required to compute the tuning frequencies is, therefore extremely complex functionally and very cumbersome to control (via software) for a maneuvering aircraft.

The beam controller of the invention overcomes the problems stated without being subject to the various drawbacks of other solutions and, in contrast, is functionally very simple and easily controlled.

SUMMARY OF THE INVENTION

The invention is directed to a method and apparatus for aligning the elevation beam pattern of an electronically scanned phased array antenna along an isodop. The invention finds utility in synthetic aperture mapping wherein the phased array antenna comprises a multiplicity of antenna elements arranged in rows and columns.

In order to align the beam along an isodop, different portions of the $csc^2$ beam are pointed at different azimuth angles. This is accomplished by adding an additional phase function that is linear for a given row ot antenna elements, but the slope is different for each row. To implement this, the beam steering controller of the invention is provided with a look-up table which stores a differential azimuth direction cosine (a slope) for each row. The values for this table are supplied by the radar computer as a function of the area being mapped. These values are correct for one azimuth angle; the direction cosines used at other angles are found by scaling the values stored in the table. To generate the correct isodop alignment phase function then, the controller takes the row value (n) for a given element and selects the appropriate slope from the look-up table. This slope is then scaled by a constant supplied by the computer; several scaling constants as a function of row (n) are supplied, and the controller selects the correct one. The net slope is then multiplied by the column (m) of the given phase shifter to find the final linear phase shift. Space stabilization of rows and columns is provided. Also elevation beam spreading is provided by a ROM that stores the elevation spreading phase as a function of array row. This phase function is added to the points and isodop aligning phase functions.

It is a principal object of the invention to provide a new and improved method and means for operating a synthetic aperture mapping radar.

It is another object of the inventon to provide means for aligning the elevation beam pattern of a synthetic aperture mapping radar along an isodop.

It is another object of the invention to provide means for correcting isodop-isogain misalignment in a synthetic aperture mapping radar.

It is another object of the invention to provide, in a synthetic aperture mapping radar, a beam steering controller whereby adequate alignment over the entire mapping region of interest in wide scan modes can be maintained with reasonable mechanization.

These together with other objects features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

Figure 2:
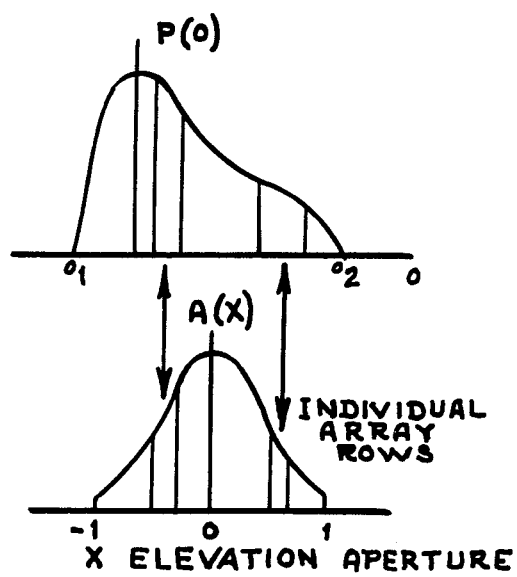
FIG. 2 is a graph showing array row-pattern association.

The solution, comprehended by the invention, to the problem of isogain, isodop misalignment described above comprises a technique for aligning a spread elevation beam along an isodop. This technique is based on two facts:

(1) To each horizontal row of elements in the antenna array, a unique portion of the elevation pattern may be assigned, as in FIG. 2. That is, it can be considered that a given row "controls" its associated portion of the beam. Contiguous rows control contiguous beam portions, and the total array, of course, controls the entire beam. The mathematical details for this are hereinafter described.

(2) The portion of the elevation pattern controlled by a given row may be aligned along an isodop by simply changing the azimuth direction cosine of that row appropriately. Elevation direction cosines are unaffected.

Figure 3:
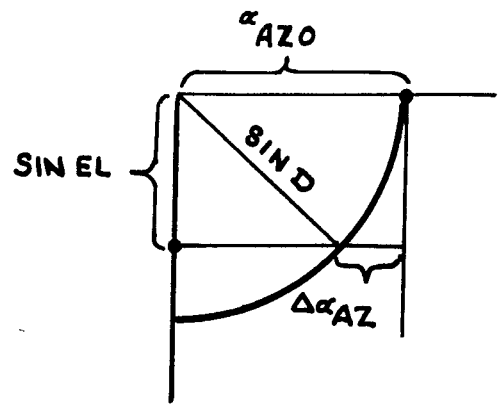
FIG. 3 is a graph showing placement of the beam onto an isodop and the geometric relationships.

FIG. 3 illustrates this second point by showing an unmodified elevation beam axis and an idosop in direction cosine space, which is the natural coordinate system for a phased array antenna. In direction cosine space the elevation beam axis is a straight line whose azimuth direction cosine is $$\alpha_{AZ} = \sin AZ_o \cos El_o$$

and an isodop is a circle of radius sin D where D is the isodop cone angle. It is noted that a given portion of the elevation beam may be shifted to lie along the isodop by changing the net azimuth direction cosine to $$\alpha_1 = \alpha_{AZ} - \Delta\alpha$$

where $$\Delta\alpha = \alpha_{AZ} - (\sin^2 D - \sin^2 El)^{\frac{1}{2}}.$$

The net azimuth direction cosine is then $$a_1 = (\sin^2 D - \sin^2 El)^{\frac{1}{2}}$$

If each portion of the elevation pattern that is associated with a given row is shifted by this amount, the beam will be along an isodop.

The peak of the beam has been scanned to a point on the ground defined by azimuth $AZ_o$ and elevation $El_o$; the isodop that includes this peak gain point is defined by $$\cos D = \cos AZ_o \cos El_o$$

Other isodops may be defined, but this choice has worked well in simulations. The El value in the sin El term is the elevation angle at which the portion of the elevation pattern controlled by a given row is directed. It is the one variable in the $\Delta\alpha$ calculation.

Figure 4:
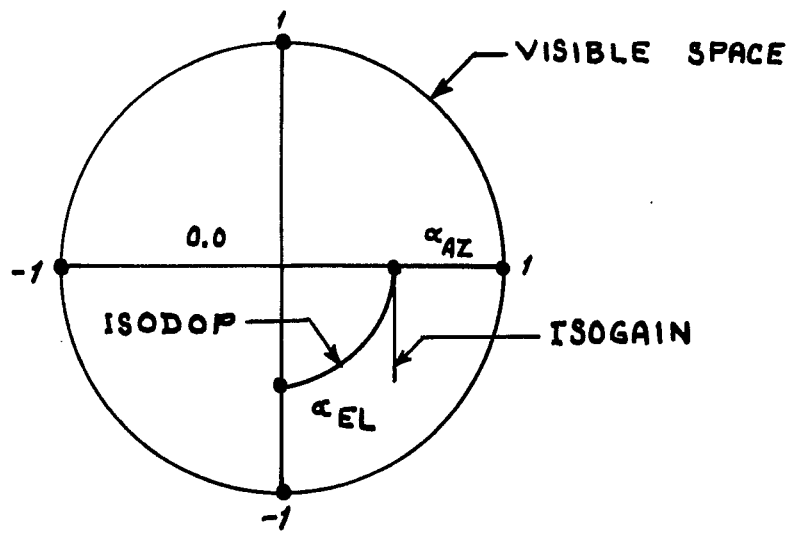
FIG. 4 is a graph showing isodop and isogain in sine space.

The mathematical details of the above are as follows:

Initially, the geometry (conventionally used by antenna designers) shown in FIG. 4 is considered. This figure maps the forward hemisphere (as seen from the antenna face) into sine space, or, more properly, direction cosine space. The direction cosines $\alpha_{az}$ and $\alpha_{el}$ of a vector R are defined in FIG. 5.

Figure 5:
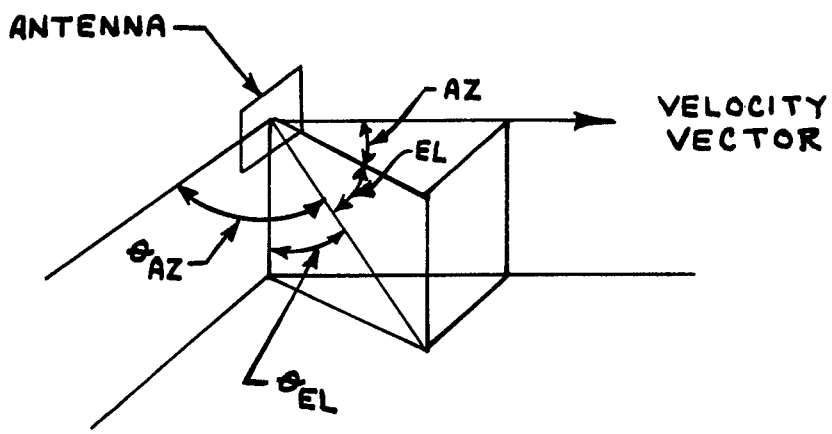
FIG. 5 is an isometric illustration of sine space geometry.

$\alpha_{az}$ = azimuth direction cosine
= $\cos \theta_{az}$
= $\sin az \cos el$
$\alpha_{el}$ = elevation direction cosine
= $\cos \theta_{el}$
= $\sin el$ Whereas az and el are defined in FIG. 5. In FIG. 4, the 0, 0 point is antenna broadside, and a circle of unit radius defines a 90 degree scan angle in any direction. It is thus the limit of the forward hemisphere. The direction cosines $\alpha_{az}$ and $\alpha_{el}$ are the same two direction cosines used by the beam controller to steer the beam.

In this coordinate system, it can be shown that an isodop is a quarter angle whose radius is the sine of the doppler angle and which lies in one of the two lower quadrants of the sine space diagram. Further, an isogain, an elevation beam axis, is a straight vertical line of constant $\alpha_{az}$, which is evident from its definition as a hyperbola about the crosstrack axis. As a record preliminary to solving the isodop alignment problem, consider the following result of geometric optical antenna pattern synthesis techniques. Let A(X) be the amplitude weighting function over the elevation and normalize $-1 \leq x \leq 1$. Second, let P ($\theta$) be the far-field elevation pattern whose mainbeam (we are chiefly interested in $csc^2$ patterns) lies in the range $\theta_1 \leq \theta \leq \theta_2$. Then the following obtains (infinite frequency approximation):

$$\frac{\int_{\theta_1}^{\theta_2} P(\theta) \cos\theta \, d\theta}{\int_{-1}^{1} A^2(x) \, dx} = \frac{\int_{\theta_1}^{\theta} P(\theta) \cos\theta \, d\theta}{\int_{-1}^{x} A^2(x) \, dx}$$

This is essentially a conservation of energy relationship. It states that the energy in a given portion of the array distribution will appear in a corresponding wedge of the far-field pattern.

In this problem, A(x), P($\theta$), $\theta_1$ and $\theta_2$ are all initially specified since the elevation pattern is determined by phase weighting. The left side of the equation is then constant, and, for a given x, one may solve numerically on a computer for $\theta$. In the case of a phased array antenna, one may use this solution to associate a unique portion of the elevation pattern with each row after array. One might say that each row "controls" its portion of the elevaton pattern. This is shown in FIG. 2.

With this fact in mind, consider FIG. 3 which is a blow-up of the isogain-isodop part of FIG. 4. Note that the beam can be shifted to an isodop by varying only the azimuth direction cosine of the beam as a function of elevation (it is a function of elevation only since the vertical element is a function only of elevation). That is, different portions of the elevation pattern must be assigned different azimuth direction cosines. The method described above makes it possible to associate a unique portion of the elevation pattern with a given row in the array; the appropriate direction can then be assigned to each row.

For example, let the beam be scanned by azimuth direction cosine $\alpha az_o$, as in FIG. 3, when presumably, the isogain is aligned with a desired isodop at some far range. Then each row is given an azimuth direction cosine $$\alpha_{az} = \alpha az_o - \Delta\alpha_{az}$$

$$\alpha_{az} = \alpha_{az} - [\sin^2 D - \sin^2 el]^{\frac{1}{2}}$$

D = doppler angle as defined in FIG. 3. The appropriate sin el for each row is given by the knowledge of which portion of the elevation beam is associated with which row.

Figure 1:
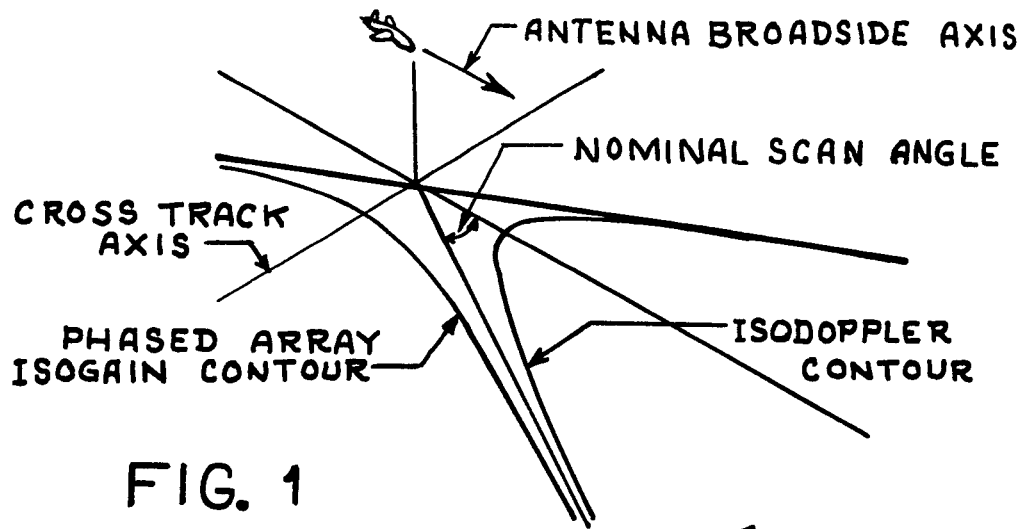
FIG. 1 is an isometric sketch showing antenna and doppler misalignment.
Figure 6:
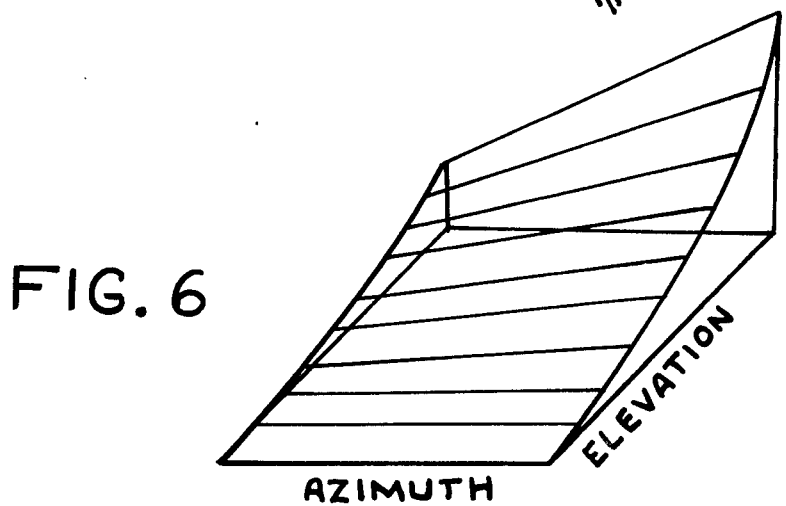
FIG. 6 is an isometric illustration of resulting phase function over aperture.

The resulting phase front over the aperture is thus linear over any given row but with changing slope as a function of row. This type of phase function is very reasonable to implement in the beam controller. FIG. 6 is a typical phase function.

This phase function is readily implementable in the beam controller hereinafter described. The controller first finds the space stabilized row and column for a given phase shifter. A look-up table furnished by the radar computer provides a slope correction ($\Delta\alpha_{az}$) as a function of row. The slope is multiplied by the element column to give the correct linear phase function. This term is then subtracted from the term used to point the beam peak ($\alpha_{az_o}$). The radar computer calculates a set of slope correction values for the controller at the beginning of mode use. These values must be scaled as a function of scan angle; the radar controller calculates scaling constants at a low data rate during the scan and sends them to the beam controller so that the original set may be scaled.

Figure 7:
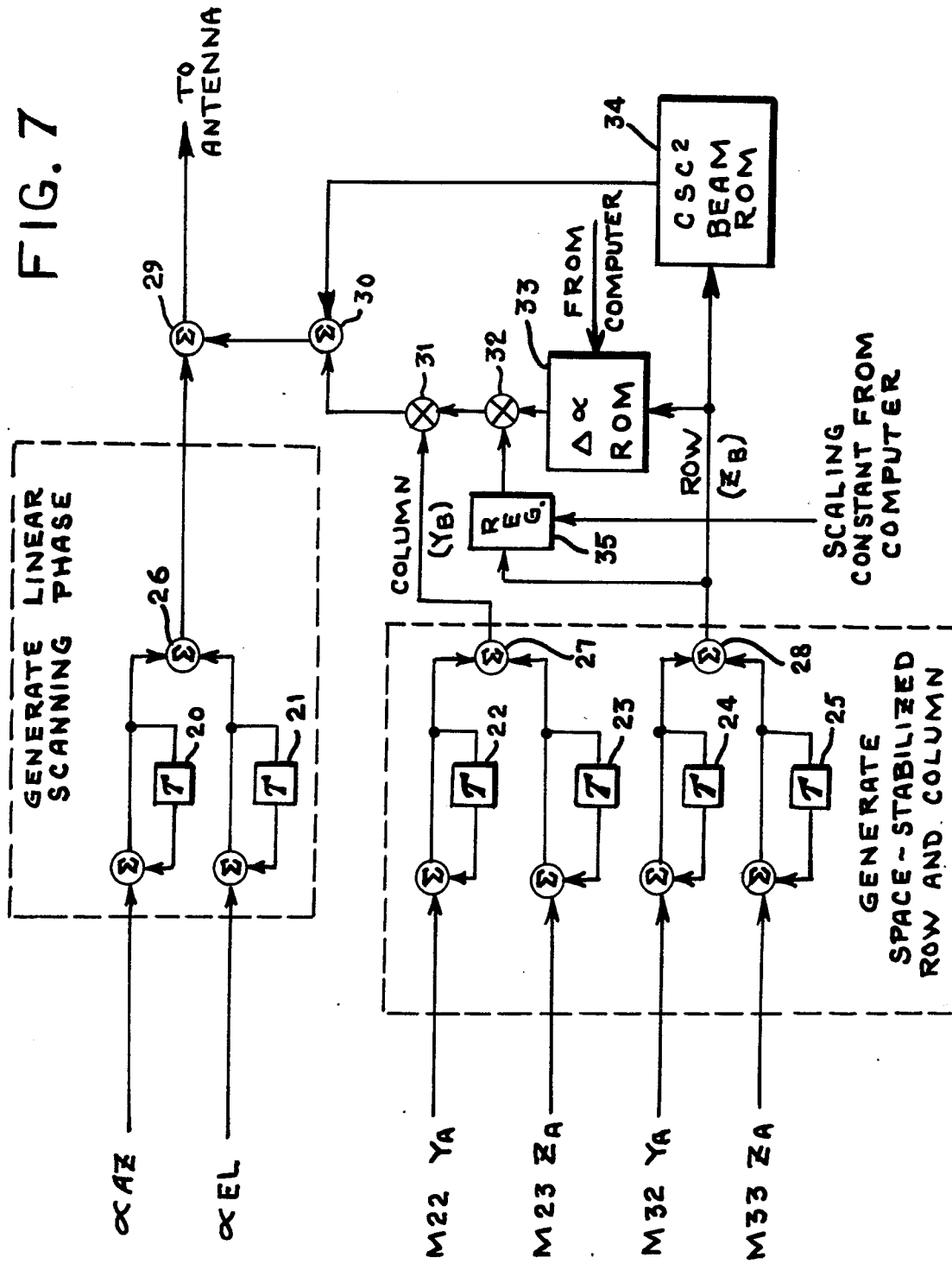
FIG. 7 shows the beam steering controller algorithm of the invention.
Figure 10:
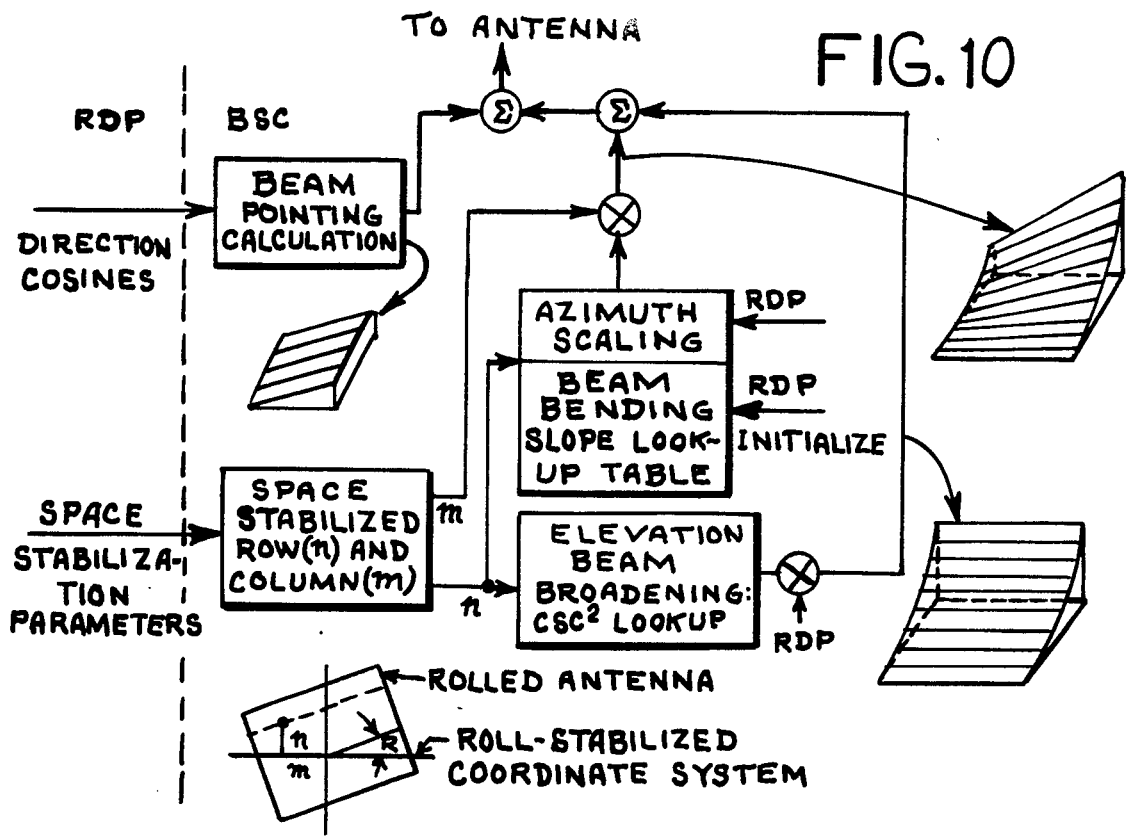
FIG. 10 is a functional block diagram of the invention showing various phase functions generated thereby.
Figure 11:
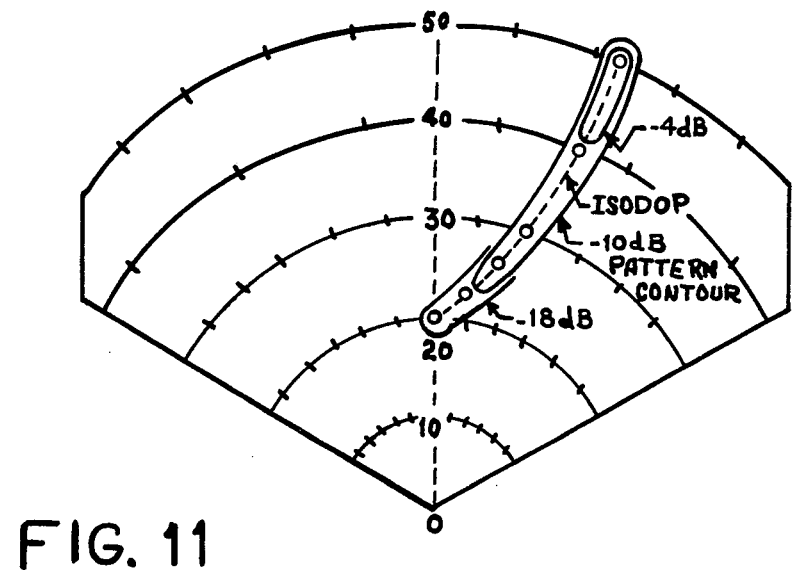
FIG. 11 is a graph showing analytic $csc^2$ beam modified with phase weighting to lie along an isodop.

The isodop-isogain alignment described above is implemented by means of a beam steering controller algorithm. FIG. 10 is a block diagram of the invention showing the phase functions generated and FIG. 7 illustrates the algorithm implementation. The device of FIG. 7 comprises integrators 20-25 summing means 26-30, multipliers 31, 32, memories 33, 34 and register 35.

The functions that the beam steering controller must perform, in conjunction with the radar computer, to align the beam along an isodop are described as follows:

(1) From a predetermined pointing angle defined by $AZ_o$ and $El_o$, generate an azimuth direction cosine $\alpha_{AZ}$ and a corresponding isodop cone angle D.

(2) Form a linear phase function over the array where the linear slope is $\alpha_{AZ}$; this points the beam in azimuth and elevation.

(3) From a knowledge of the elevation pattern, calculate which portion of the pattern is controlled by which row. This can be stored as a table of elevation angle (relative to beam peak) as a function of row.

(4) Calculate $\Delta\alpha$ values for each row from $$\Delta\alpha = \alpha_{AZ} - (\sin^2 D - \sin^2 El)^{\frac{1}{2}}$$

The El values are obtained by shifting the values obtained in step (3) by $El_o$ to form absolute elevation. (5) Using these values of $\Delta\alpha$, form a phase function over the array which for a given row, is linear with slope equal to $\Delta\alpha$. The phase function is then linear for each row, but the slope increases from row to row. FIG. 6 shows a typical resulting phase function.

(6) Subtract this phase function from the one generated in step (2) to form the net desired phase function. Each row now has an azimuth direction cosine of $$\alpha_1 = (\sin^2 D - \sin^2 El)^{\frac{1}{2}}$$

The radar computer, performs step (1) by calculating direction cosines and the isodop angle.

The beam is pointed in azimuth and elevation by integrated the azimuth and elevation direction cosines to form linear phase functions over the array (step 2). Two linear integrators 20, 21 perform this; this function has been done in all previous beam controllers.

The table of relative elevation angle as a function of row for a given elevation pattern (step 3) may be precalculated and stored in the radar computer. The computer must, however, calculate the $\Delta\alpha$ values for each row as in step (4) and store them in ROM 32 in the beam controller. These rather extensive calculations would be done at the beginning of a map scan.

Before it can select the appropriate $\Delta\alpha$ value, the controller must determine the row and column of a given array element. This is done by the four integrators 22–25 and two adders 27, 28 indicated. The row and column calculated must be in a space-stabilized coordinate system; otherwise the beam position would vary with aircraft motion. The use of the four integrators and their required inputs from the computer are derived below.

Given the correct value for the element row, the controller selects the corresponding $\Delta\alpha$ value from the ROM 33 and multiplies it by the element column value. This forms a linear phase function of slope $\Delta\alpha$ over the given row, as was required in (5). This value is then subtracted from the linear beam pointing value for that element to form the net desired phase function.

This net process requires little additional beam controller hardware, but it does require a substantial amount of computer software to support it.

With this beam controller mechanization, the additional required function of elevation beam spreading is easily performed. With a space-stabilized row value available; the controller can include a ROM 34 that stores the elevation spreading phase function as a function of array row. This phase is then added to the pointing and isodop-aligning phase function.

If the ground patch being mapped has a small azimuth angular coverage ($<10°$), a single set of $\Delta\alpha$ values will be sufficient for the entire scan. For larger azimuth scans, the $\Delta\alpha$ values originally calculated and stored must be scaled. The scaling constant provided by the computer is the ratio of $\Delta\alpha$ at a new, desired azimuth scan angle to the value of $\Delta\alpha$ stored in register 35 of the beam controller. The constant must be updated approximately every 10° in azimuth.

Calibration of stabilized row and column is described as follows:

Considered from a point out in space looking back at the antenna phase shift distributionm then to stabilize the pattern the phase distribution in beam coordinates must remain constant as roll, pitch and yaw is applied to the aircraft. Therefore the required phase distribution is defined in terms of a rectangular array in beam coordinates. However the actual phase shifters are commanded in antenna space, and therefore it is necessary to know the coordinate transform from antenna coordinates to beam coordinates to properly stabilize the beam pattern. To change antenna coordinates into beam coordinates antenna coordinates must first be changed back to reference coordinates. This is done by unrolling, unpitching and unyawing the aircraft. Then the beam must be repointed by making the appropriate azimuth and elevation rotations. Thus $$\begin{bmatrix} X_B \\ Y_B \\ Z_B \end{bmatrix} = EAY^{-1}P^{-1}R^{-1} \begin{bmatrix} X_A \\ Y_A \\ Z_A \end{bmatrix} = M \begin{bmatrix} X_A \\ Y_A \\ Z_A \end{bmatrix} =$$

$$\begin{bmatrix} M_{11} & M_{12} & M_{13} \\ M_{21} & M_{22} & M_{23} \\ M_{31} & M_{32} & M_{33} \end{bmatrix} \begin{bmatrix} X_A \\ Y_A \\ Z_A \end{bmatrix}$$

where $$E = \begin{bmatrix} CE & 0 & -SE \\ 0 & 1 & 0 \\ SE & 0 & CE \end{bmatrix} \quad A = \begin{bmatrix} CA & SA & 0 \\ -SA & CA & 0 \\ 0 & 0 & 1 \end{bmatrix}$$

$$R = \begin{bmatrix} 1 & 0 & 0 \\ 0 & CR & -SR \\ 0 & SR & CR \end{bmatrix} \quad P = \begin{bmatrix} CP & 0 & SP \\ 0 & 1 & 0 \\ -SP & 0 & CP \end{bmatrix} \quad Y = \begin{bmatrix} CY & -SY & 0 \\ SY & CY & 0 \\ 0 & 0 & 1 \end{bmatrix}$$

$M_{22} = -S(A - Y) SPSR + C(A - Y) CR$
$M_{23} = -S(A - Y) SPCR - C(A - Y) SR$
$M_{32} + SEC(A - Y) SPSR + SES(A - Y) CR + CECPSR$
$M_{33} = SEC(A - Y) SPCR - SES(A - Y) SR + CECPCR$
$M_{12} = CEC(A - Y) SPSR + CES(A - Y) CR - SECPSR$
$M_{13} = CEC(A - Y) SPCR - CES(A - Y) SR - SECPCR$

Thus the element in antenna column $Y_A$ and row $Z_A$ contributes to the beam coordinate phase function as column $Y_B$ and row $Z_B$ where $$Y_B = M_{22} Y_A + M_{23} Z_A \text{ and}$$

$$Z_B = M_{32} Y_A + M_{33} Z_a$$

Thus the space stabilized row and column, $Y_B$ and $Z_B$, are determined by integrating the four coefficients, $M_{22}$, $M_{23}$, $M_{32}$, $M_{33}$ over the aperture as described by the above equations. This operation is performed by the four integrators and two adders, as is shown in FIG. 7. The four inputs from the radar computer are then $M_{22} \Delta Y_A$, $M_{23} \Delta Z_A$, $M_{32} \Delta Y_A$ and $M_{33} \Delta Z_A$ where $\Delta Z_A$ = row spacing $\Delta Y_A$ = column spacing The controller uses $M_{12}$ (azimuth direction cosine) and $M_{13}$ (elevation direction cosine) to perform the conventional space-stabilized beam pointing.

Figure 8:
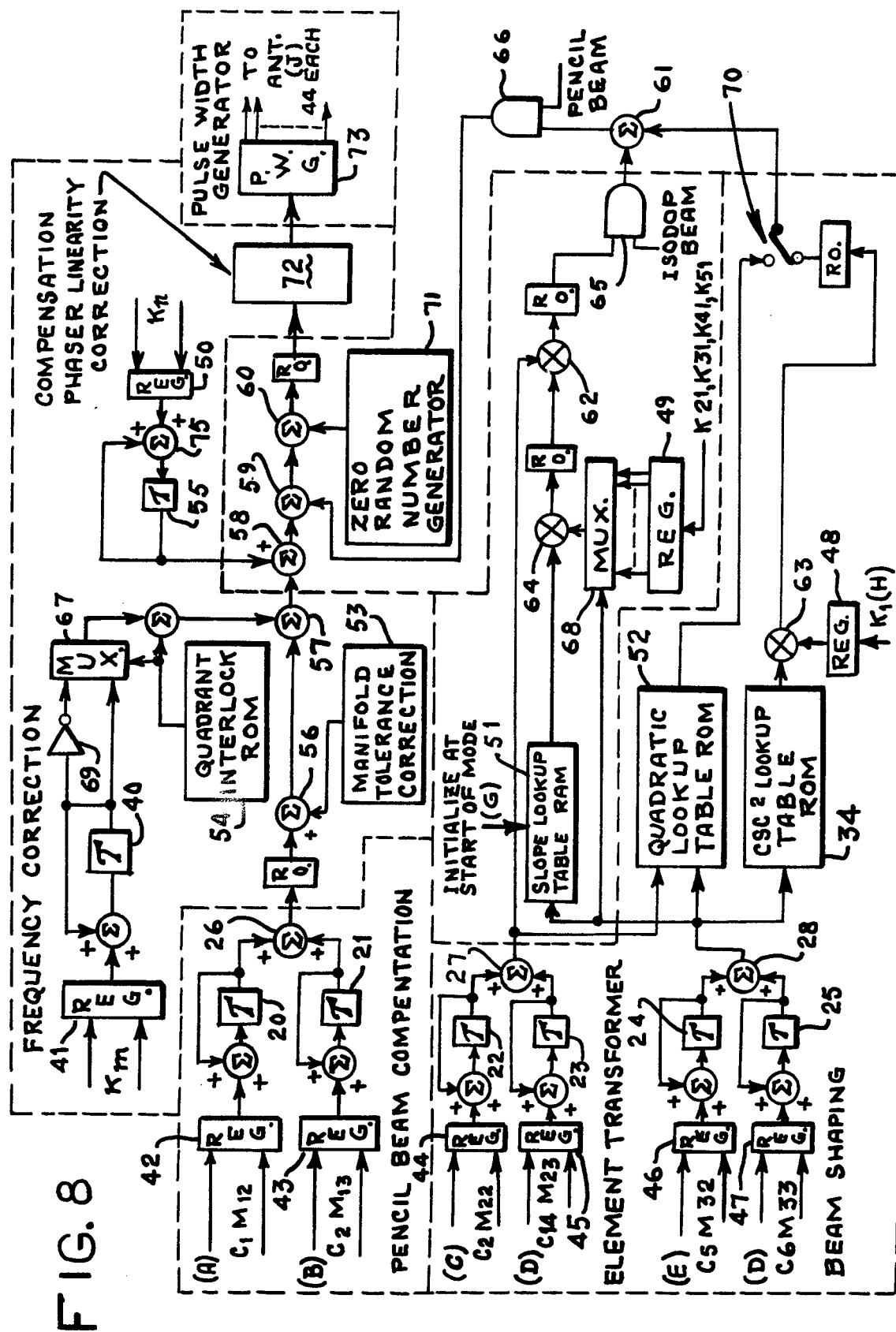
FIG. 8 is a detailed version of the beam sterring controller algorithm of the invention.

A detailed beam controller functional block diagram is shown in FIG. 8. In addition to the various elements shown in FIG. 7 this implementation includes integrator 40, registers 41-50, RAM 51, ROMS 52-54, integrator 55, summing means 56-61 and 75, multipliers 62-64, AND gates 65, 66, multipliers 67, 68, inverter 69, switch 70, random number generator 71, ROM 72, and pulse width generator 73.

Figure 9A:
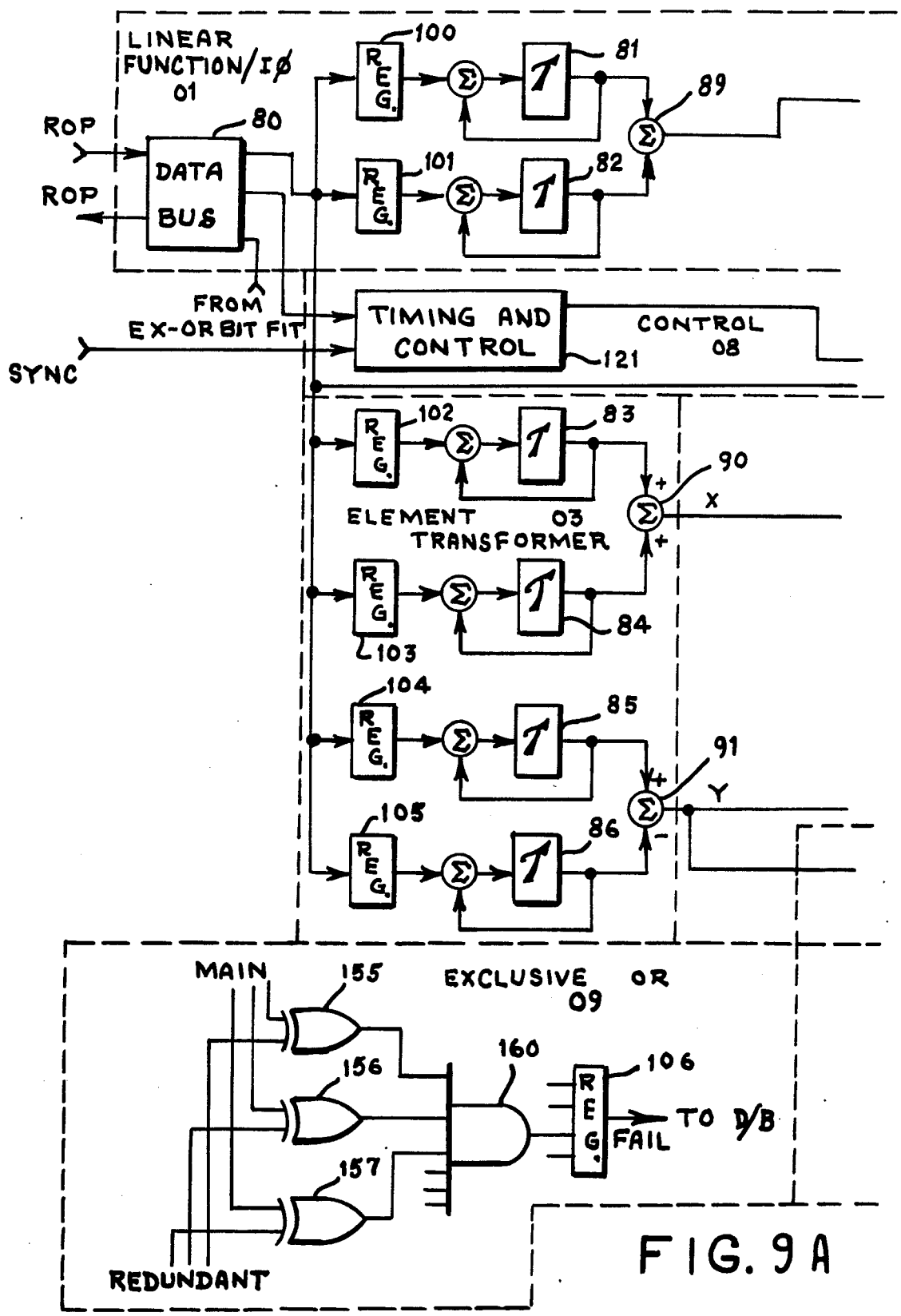
FIGS. 9a, 9b and 9c together comprise an electronic circuit diagram of one implementation of the invention.
Figure 9B:
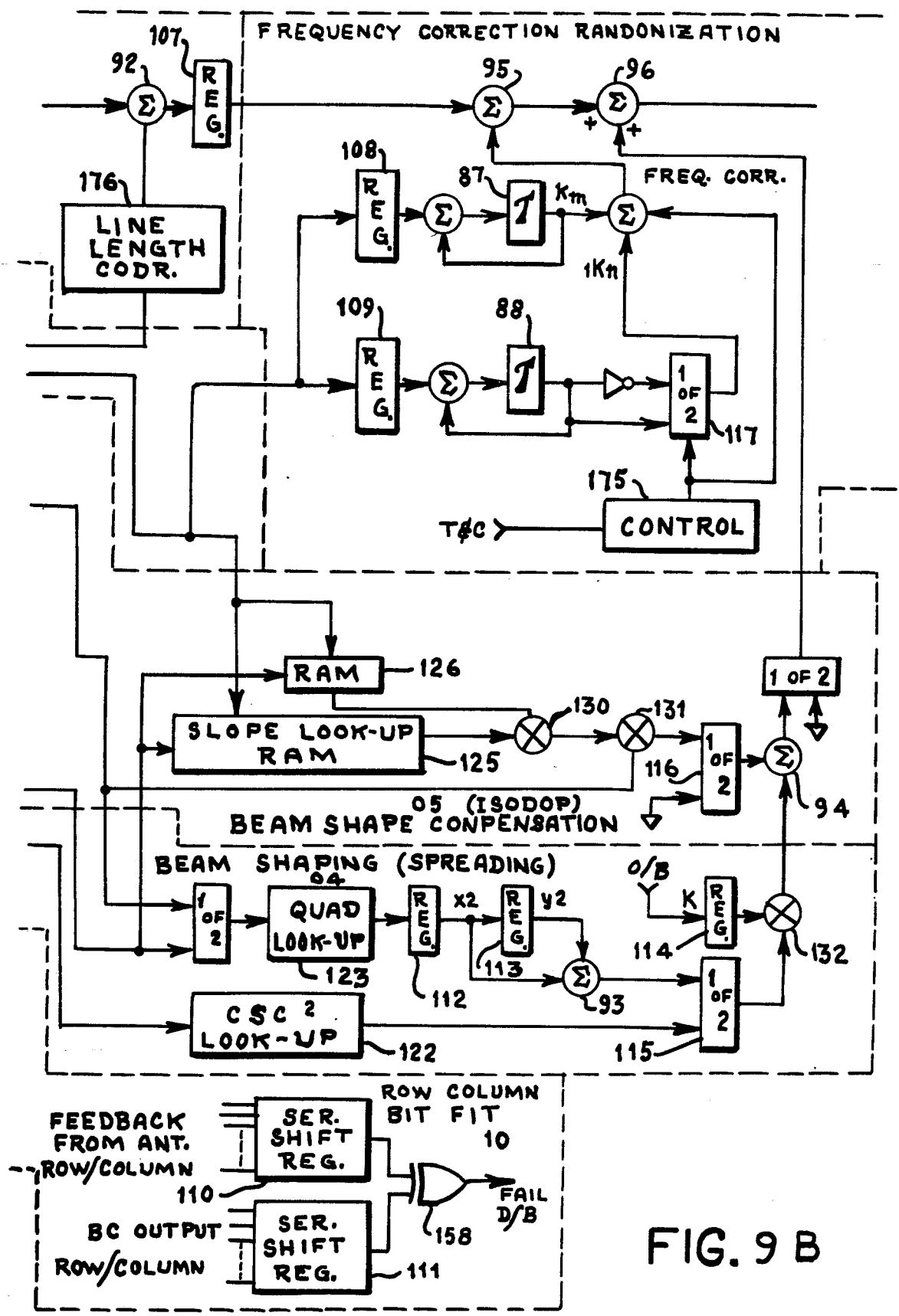
Figure 9C:
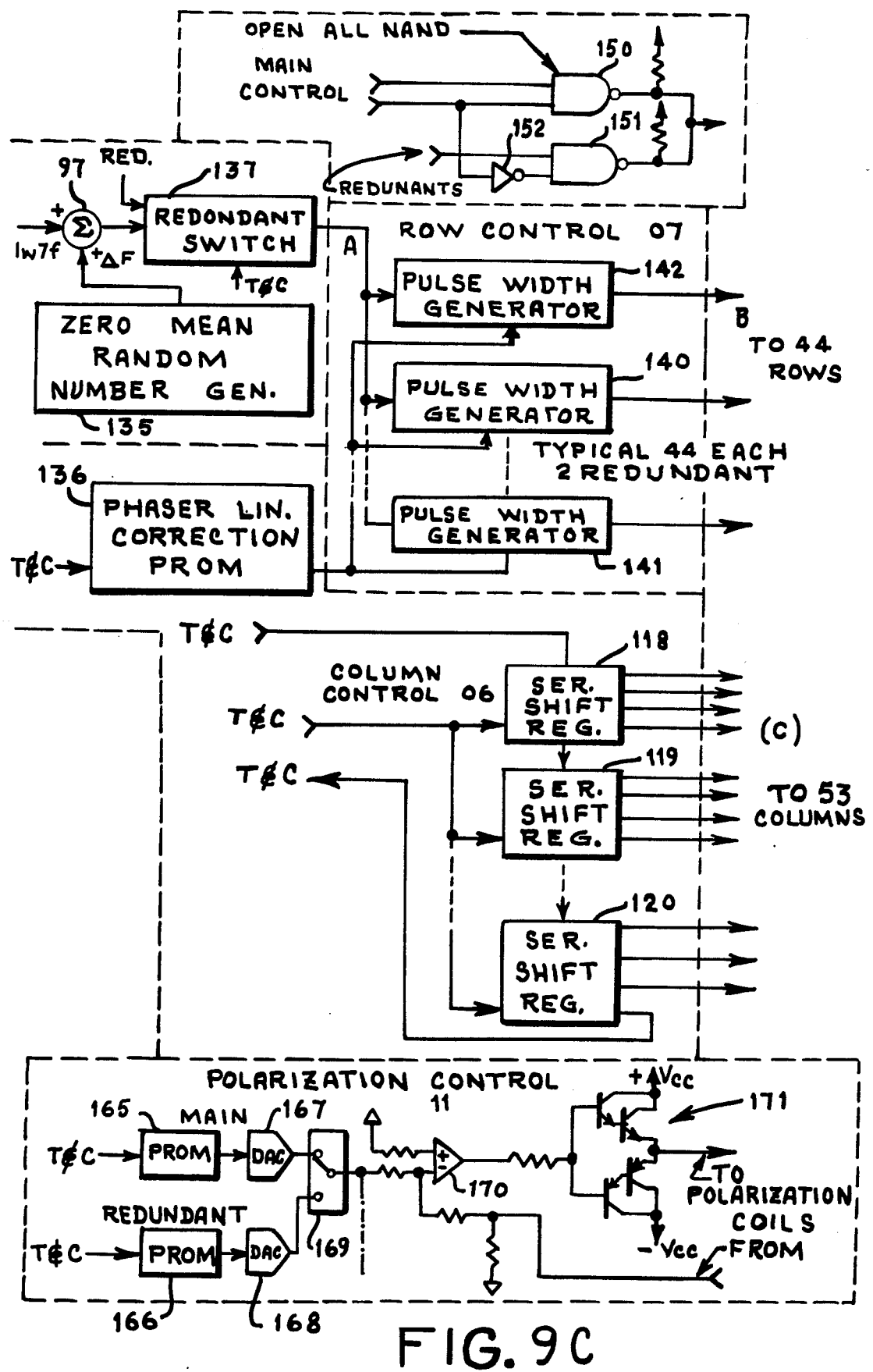

A beam controller electronic structural block diagram is shown by FIGS. 9a, 9b, 9c. The circuit includes data bus 80, integrators 81-88 summers 89-97, registers 100-120, timing and control circuit 121, ROMs 122, 123, RAMs 125, 126, multipliers 130, 131, 132, random number generator 135, phase linear corrector PROM 136, redundant switch 137, pulse width generators 140-142, NAND gates 150, 151, inverter 152, exclusive OR gates 155-158, AND gate 160, PROMs 165, 166, digital/analog converters 167, 168, switch 169, amplifier 170, transistor circuit 171, and line length corrector 176 arranged in the circuit configuration shown.

The signals developed by the beam controller are phase angle commands that interface directly with the phased array antenna. Each phase angle is applied to one phase shifter of the phased array antenna; a different phase command for each phase shifter is computed by the beam controller. Specifically, each digital phase word (modulo 360°) is converted into an electrical current by the phasor controller. The current level, which is directly proportional to the phase command, then adjusts the phase angle of the phase shifter via a magnetic circuit.

FIG. 10 is a graph showing the result of a beam being modified along an isodop in accordance with the above described invention.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In a synthetic aperture mapping radar having an electronically scanned phased array antenna comprised of multiple antenna elements in rows and columns and a computer adapted to develop beam direction cosine data, beam space stabilization parameter data, elevation beam pattern data and azimuth scan scaling factor data, the improvement residing in a beam steering controller, said beam steering controller receiving direction cosine data, beam space stabilization data and elevation beam pattern data from said computer and developing therefrom azimuth direction cosine adjustment signals for each element row of said phased aray antenna, said azimuth direction cosine adjustment signals having values that effect alignment of the antenna elevation beam pattern with a preselected isodop, said beam steering controller comprising:
   means for developing a linear phase function over said phased array,
   means for developing an isodop alignment phase function over said phased array, and
   subtracting means, said subtracting means subtracting said isodop alignment phase function from said linear phase function and outputting direction cosine adjustment signals.

2. In a synthetic aperture mapping radar, the beam steering controller defined in claim 1 including means for providing a beam elevation spreading phase function as a function of array row, said beam elevation spreading phase function being added to said isodop alignment phase function.

3. In a synthetic aperture mapping radar, the beam steering controller defined in claim 2 including means for scaling values generated by said means for developing an isodop alignment phase function to accommodate azimuth angle coverage of greater than 10°.

4. In a synthetic aperture mapping radar, the beam steering controller defined in claim 3 wherein:
   said means for developing a linear phase function comprises first and second integrators receiving beam direction cosine data from said radar and a first summing means summing the outputs of said first and second integrators;
   said means for developing an isodop alignment phase function comprises third and fourth integrators receiving beam space stabilization paramater data from said computer, a second summing means summing the outputs thereof, fifth and sixth integrators receiving beam space stabilization parameter data from said computer, a third summing means summing the outputs thereof, a first ROM enabled by elevation beam pattern data from said computer and the output of said third summing means, and first multiplier means for multiplying the output of said first ROM and the output of said second summing means;
   said means for producing a beam elevation spreading phase function comprises a second ROM containing the elevation spreading function as a function of array row, and a fourth summing means said second ROM enabled by the output of said third summing means, said fourth summing means summing the output of said second ROM and said multiplier means, the output of said multiplier means being fed to said subtracting means; and
   said means for scaling comprises a register receiving azimuth scan scaling factor data from said computer and a second multiplier means, said register receiving the output of said third summing means, said second multiplier multiplying the outputs of said register and said first ROM and feeding said second multiplier.

5. In a synthetic aperture mapping radar, the beam steering controller defined in claim 4 wherein said preselected isodop is defined by $\cos D = \cos AZ_o \cos El_o$, wherein:
   D is the isodop cone angle,
   $AZ_o$ is beam azimuth direction, and
   $El_o$ is beam elevation direction.

* * * * *